C. A. DAWLEY.
FLUID PRESSURE MOTOR.
APPLICATION FILED APR. 3, 1912.

1,054,754.

Patented Mar. 4, 1913.

3 SHEETS—SHEET 1.

Witnesses:

Inventor
Clarence A. Dawley
By his Attorneys

C. A. DAWLEY.
FLUID PRESSURE MOTOR.
APPLICATION FILED APR. 3, 1912.
1,054,754.
Patented Mar. 4, 1913.
3 SHEETS—SHEET 2.
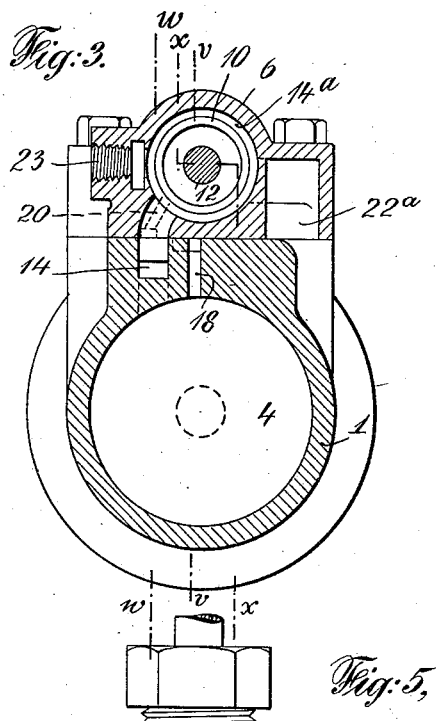
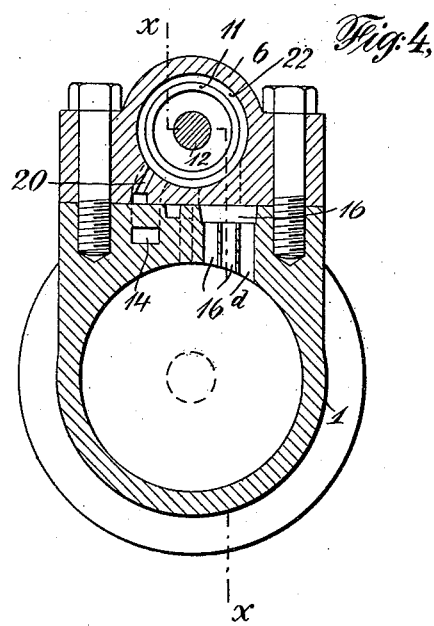
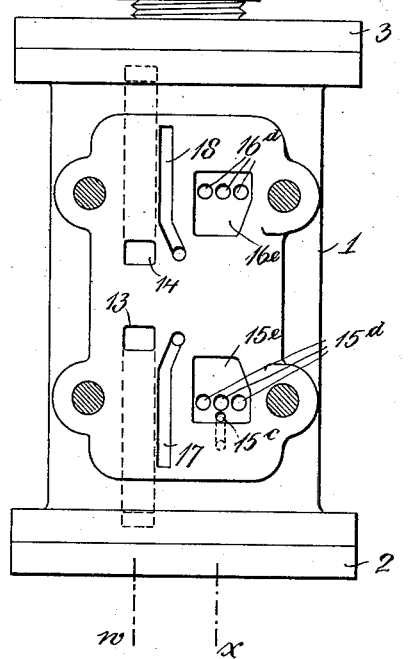
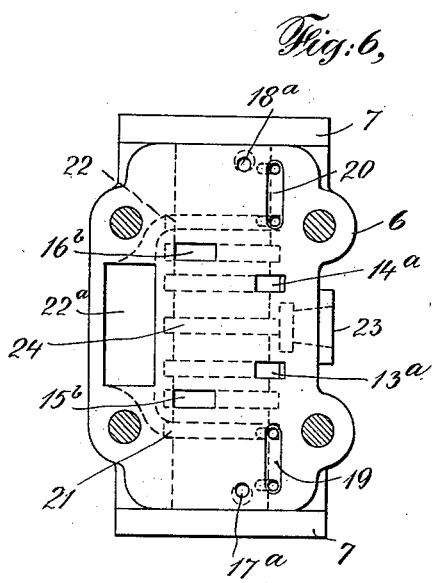

C. A. DAWLEY.
FLUID PRESSURE MOTOR.
APPLICATION FILED APR. 3, 1912.
1,054,754.
Patented Mar. 4, 1913.
3 SHEETS—SHEET 3.
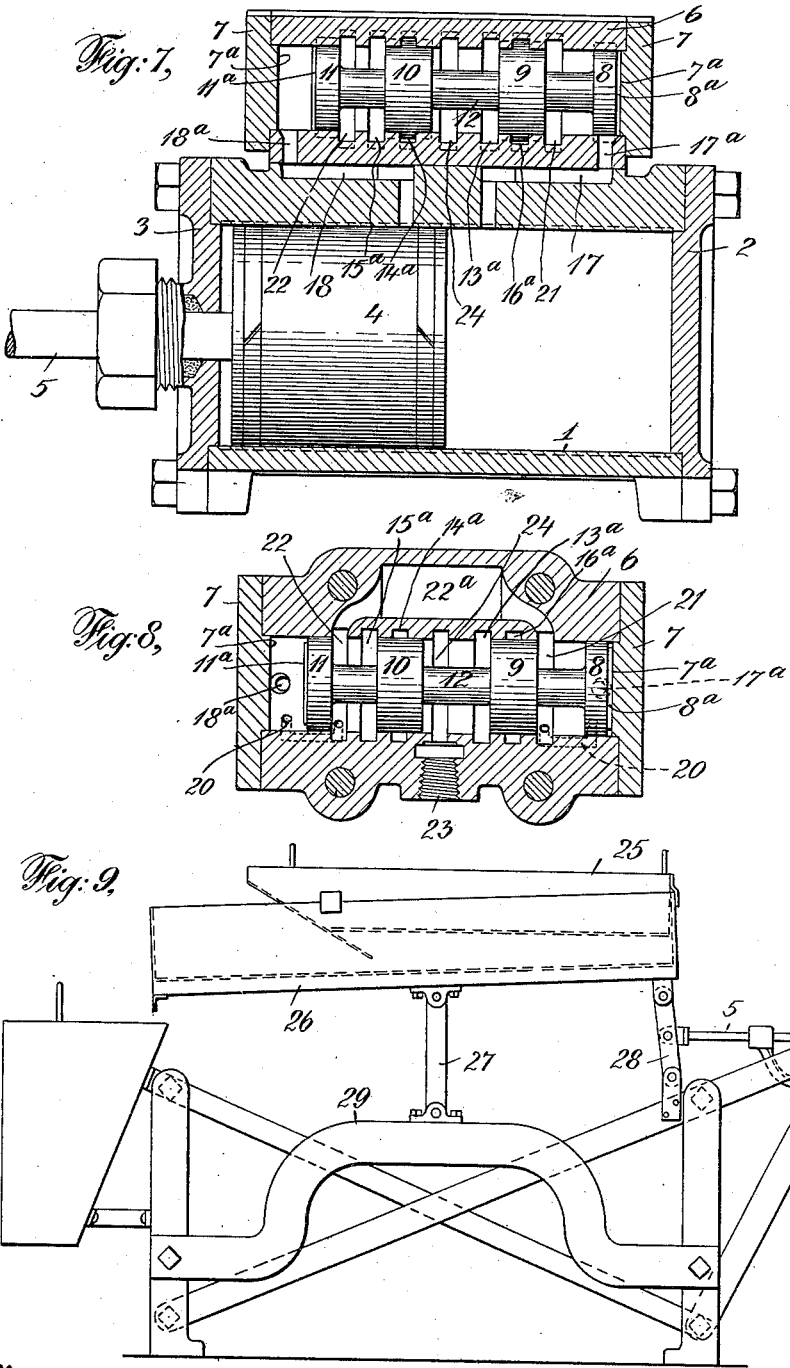
Witnesses:
Max B. A. Doring.
Paul H. Frank
Inventor
Clarence A. Dawley
By his Attorneys
Brown Ranger Moody & Matty

UNITED STATES PATENT OFFICE.

CLARENCE A. DAWLEY, OF PLAINFIELD, NEW JERSEY, ASSIGNOR TO THOMAS W. PANGBORN COMPANY, OF JERSEY CITY, NEW JERSEY, A CORPORATION OF NEW YORK.

FLUID-PRESSURE MOTOR.

1,054,754.   Specification of Letters Patent.   Patented Mar. 4, 1913.

Application filed April 3, 1912. Serial No. 688,281.

*To all whom it may concern:*

Be it known that I, CLARENCE A. DAWLEY, a citizen of the United States, and a resident of Plainfield, in the county of Union and State of New Jersey, have invented certain new and useful Improvements in Fluid-Pressure Motors, of which the following is a specification.

My invention relates to improvements in fluid pressure motors and comprises improvements in valve gear of such motors whereby the valves are shifted automatically and whereby a high degree of cushioning is obtained at both ends of the stroke.

The improved motor herein described is particularly intended for operating sand riddling machines, in which machines such high degree of cushioning is desirable.

The object of my invention is to provide a simple and compact reciprocating motor having no external valve gear and which by its design is well adapted for operating sand riddling machines and the like, and which may be made easily and at small expense.

I will now proceed to describe my invention with reference to the accompanying drawings and will then point out the novel features in claims.

Figure 1:
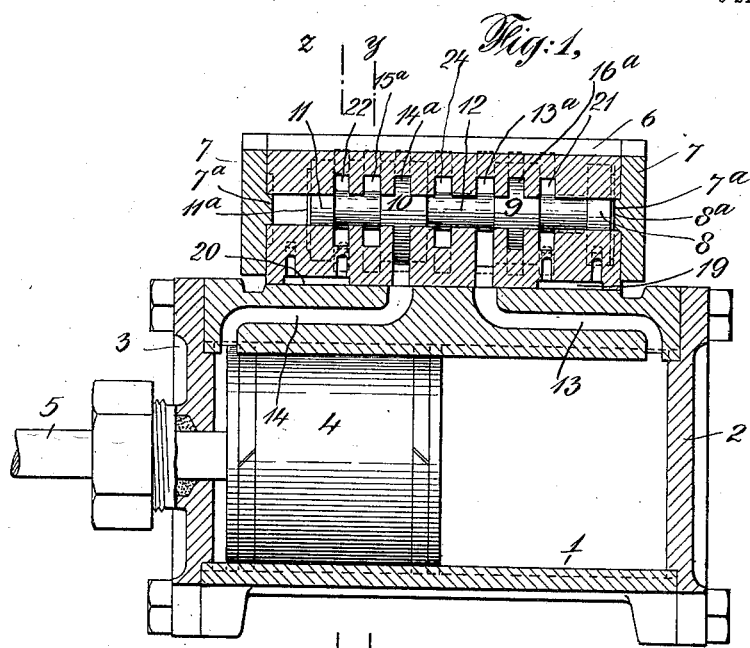
Figure 2:
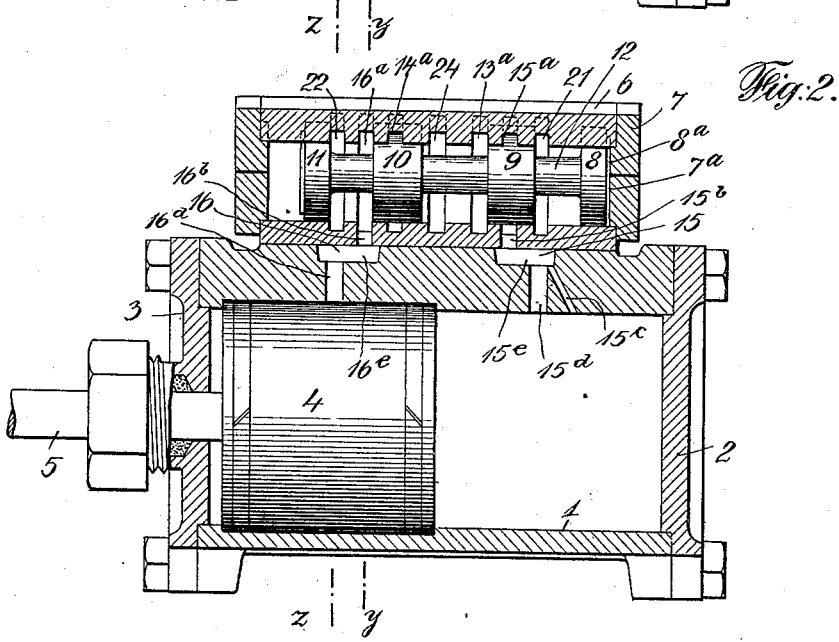

In said drawings: Figure 1 shows a longitudinal section of the motor on the line $w$—$w$ of Figs. 3 and 5; that is to say, through the admission ports. Fig. 2 shows a longitudinal section of the motor on the irregular line $x$—$x$ of Figs. 3 and 4; that is to say, through the exhaust ports. Fig. 3 shows a transverse section on the line $y$—$y$ of Figs. 1 and 2; that is to say, through one of the admission ports. Fig. 4 shows a transverse section on the line $z$—$z$ of Figs. 1 and 2, that is to say, through one of the admission ports. Fig. 5 shows a top view of the cylinder, the valve chest having been removed. Fig. 6 shows a bottom view of the valve chest. Fig. 7 shows a longitudinal section of the motor on the section line $v$—$v$ of Fig. 3; that is to say, through the valve actuating ports. Fig. 8 shows a longitudinal section of the valve chest. Fig. 9 shows a side elevation of a riddling machine comprising my improved motor, this figure showing one way of using the motor in such machines.

In the drawings, 1 designates the cylinder, 2 the rear cylinder head, 3 the front cylinder head, 4 the piston, 5 the piston rod, and 6 the valve chamber.

7, 7 designate front and rear heads of the valve chamber. The valve within this chamber is of the piston type, comprising four valve pistons 8, 9, 10 and 11 connected by a central spindle 12. An admission port 13 leads from the valve chamber to the rear end of cylinder 1, and another admission port 14 leads from the valve chamber to the front end of cylinder 1. These ports 13 and 14 terminate in the top face of the cylinder and the valve chest is provided with corresponding annular grooves $13^a$ and $14^a$ communicating with ports 13 and 14 respectively, when the valve chamber and cylinder are assembled.

15 designates an exhaust port for the rear end of cylinder 1, and 16 an exhaust port for the front end of cylinder 1, the valve chamber, 6, having in its walls, corresponding grooves $15^a$ and $16^a$ communicating, through recess $15^b$ and $16^b$ respectively, in the bottom face of the valve chamber, with said ports 15 and 16, when the valve chamber and cylinder are assembled.

In this motor the valve is shifted by means of fluid under pressure acting on the end valve pistons 8 and 11, such air under pressure being communicated, to one or the other end of the valve chest, by ports uncovered by the main piston 4 in its motion. These valve-actuating ports are shown particularly in Figs. 3, 5, 6 and 7, and comprise ports 17 and 18 in the wall of the upper portion of the cylinder, registering at their ends with holes $17^a$ and $18^a$ in the wall of the bottom portion of the valve chest, these holes $17^a$ and $18^a$ leading to the end portions of the valve chest. The end pistons 8 and 11 of the valve are provided with bosses $8^a$ and $11^a$ of a diameter somewhat less than that of the pistons 8 and 11, and the end caps 7 of the valve chest are provided with corresponding bosses $7^a$; the result of which construction is that when the valve is at either end of its stroke there is an annular space between its end piston, 8, or 11, and the adjacent end cap of the valve chest, with which annular space the valve-actuating port $17^a$ or $18^a$ communicates, so that when main piston 4 uncovers one of the valve actuating ports 17 or 18, fluid under pressure is communicated through that port to the corresponding valve-actuating piston, 8 or 11, causing the valve to move to the opposite end of the valve chamber. To relieve the pressure in that end of the valve chest toward which the valve moves when so actuated, relief ports 19 and 20 are provided in the wall of the valve chest, such relief ports connecting the end portions of the valve chest with the valve port grooves 21 and 22 respectively, of the valve chest, which grooves are exhaust ports, and communicate, as indicated particularly in Fig. 8, with an exhaust outlet 22ª, formed in the exterior surface of the valve chest. Near the end of the travel of the valve, that valve piston 8 or 11, which is at the front of the valve, with reference to the then direction of motion of the valve, over-rides its corresponding relief port, 19 or 20, imprisoning fluid in the end of the valve chamber, which fluid so imprisoned serves to cushion the valve and bring it to rest without pounding.

23 (Figs. 3, 6 and 8) designates a valve-chest admission port through which fluid under pressure is admitted to the central portion of the valve chest, intermediate the valve pistons 9 and 10, this port 23 communicating with the central valve groove 24 of the valve chest.

The operation of the motor is as follows: In Figs. 1, 2, 7 and 8 the piston and valve are shown in the same position, namely, the valve being at the rear end of its stroke and the piston at the front end of its stroke. This may be assumed to be a position of rest, for if the motor were in operation, fluid under pressure communicated through port 17 upon the uncovering of that port by piston 4, would have already shifted the valve to the opposite position. With the parts in the positions shown, if air or steam under pressure be admitted through connection 23, and central groove 24, of the valve chest, to the space between valve pistons 9 and 10, it will pass, with the valve in the position shown, through port 13 into cylinder 1 and thence (the piston 4 being at the opposite end of its stroke) through valve-actuating ports 17 and 17ª to the end portion of the valve chest, in rear of valve piston 8, and so will shift the valve to its opposite position. At the beginning of the admission of air through port 13 to the rear end of cylinder 1, exhaust port 15—15ª is closed by valve piston 9, but as the valve moves, the exhaust port 15—15ª is opened by valve piston 9, cylinder 1 then exhausting through ports 15—15ª into the portion of the valve chest between valve pistons 8 and 9, and thence into groove 21 and the exhaust outlet 22. The valve having been shifted, to the position opposite that shown in the drawings, valve piston 10 has uncovered admission port 14 and steam or air under pressure passes from the portion of the valve chest intermediate valve pistons 9 and 10, through port 14 to the front end of cylinder 1, moving piston 4 backward. During such backward motion of the piston, the exhaust port 15 is overridden, also the supplemental exhaust port 15ᶜ, hereinafter mentioned, after which the remaining air or steam in the rear end of cylinder 1 is compressed, forming a cushion to check the motion of the piston 4 and the parts driven thereby. Near the end of the backward stroke of piston 4, valve actuating port 18 is opened and air or steam under pressure passes from the front end of cylinder 1 through ports 18—18ª into the front end of the valve chest, shifting the valve back to the positions shown in Figs. 1, 2 and 7, whereby admission port 14 is closed and admission port 13 is opened, and exhaust port 15 is closed and exhaust port 16 opened; whereupon the piston 4 will be moved forward again. Each time the valve moves as described, its end piston, 8 or 11, as the case may be, uncovers the relief port, 19 or 20, so connecting that end of the valve chamber into which the actuating fluid has been admitted, to exhaust.

As previously stated, this motor is particularly intended for operating sand riddling and sand separating machines; in which case the motor will ordinarily be operated by compressed air. In Fig. 9 I have shown the motor operatively connected to one well known type of sand riddling or separating machine. Said machine comprises a riddle 25 removably mounted upon a screen box 26, which screen box is carried by swinging supports 27 and 28 themselves carried by a frame 29. The cylinder, 1, of my improved motor is pivotally mounted upon an extension of this frame, and its piston rod 5 is connected to the swinging support 28. When the motor is in operation, the reciprocating motion of the piston rod 5 communicates a rocking motion to the screen box 26 and riddle 25.

In sand riddling or sifting machines such as illustrated and described, a high degree of cushioning is desirable, in the fluid pressure motor actuating the machine, for the riddle, when loaded, has great inertia. Hence the exhaust ports, 15 and 16, of my motor, are located well back from the ends of the cylinder, so that they shall be overridden by the piston 4 well before the end of the stroke is reached. This obviates danger of knocking out the piston heads. These riddling machines commonly require less cushioning at one end of the cylinder than at the other. In the machine shown in Fig. 9, the screen box 26 when loaded has a tendency to swing forward, or away from the motor; therefore a higher degree of cushioning is required at the front end of cylinder 1 than at the rear end thereof; for which reason a supplemental exhaust port 15ᶜ (see Fig. 2) is provided, this supplemental exhaust port leaving the cylinder at a point somewhat in rear of that at which the main exhaust port 15 leaves the cylinder.

The motor herein described is designed with a view to manufacture with as little machining as possible, and that of a simple nature, and also with a view to making the motor compact and relatively light. To the end that the motor may be cheap to manufacture, the various port passages are, so far as practicable, recesses in the adjacent faces of the cylinder and valve chest; and where accurate location of the ports is essential, as in the case of the exhaust ports of the cylinder, the valve shifting ports of the valve chest, and the cushion and relief ports of the valve chest, such accurate location is obtained by forming the end portions of the port passages as bored holes. Thus, in the case of the cylinder exhaust ports 15 and 16, accurate location of which is desirable, to insure uniform cushioning in different motors of the same type, the cylinder terminals of these exhaust ports are bored holes 16ᵈ; the major portion of the exhaust ports 15 and 16 being recesses 15ᵉ and 16ᵉ formed in the top face of the cylinder during the casting of the cylinder. Similarly, the relief passages 19 and 20 of the valve chest are in the main recesses cast in the bottom face of the valve chest, terminating at their ends in bored holes leading to the grooves 21 and 22 and into the end portions of the valve chest. Similarly, the valve shifting ports 17 and 18, are, in the main, recesses formed in the top face of the cylinder, and terminating at their ends in holes bored in the cylinder and valve chest respectively. In a motor of the proportions shown, it would be difficult to provide room for both these valve shifting ports 17 and 18, and the admission ports 13 and 14, if the admission ports, as well as the valve shifting ports, were in the main recesses formed in the top surface of the cylinder; therefore these admission ports, 13 and 14, are cored passages of the cylinder casting, sunk well below the top face of the cylinder casting, so as to leave a sufficient bridge of metal between these admission ports and the valve shifting ports 17 and 18. A further advantage of high cylinder compression, in this motor, is that thereby ample pressure to shift the valve, even when the motor is running light, is assured. When this motor is used to operate a sand riddling or separating machine, it will frequently be started in operation before sand has been placed in the machine, and therefore at the start the machine will be operating under friction load only; and from time to time the load on the machine varies very greatly. But owing to the high compression obtained in the ends of the cylinders, through the fact that the exhaust ports are over-ridden by the pistons well before the end of the stroke is reached, and owing to the fact that the valve actuating ports, 17 and 18, are not opened by the piston 4 until after the closure of the corresponding exhaust ports, it is assured that there shall always, during the operation of the motor, be sufficient pressure in the cylinder to shift the valve, because the piston cannot move far enough to open the valve actuating ports, unless there be sufficient pressure behind the piston to overcome the compression in the end of the cylinder; and the pressure required to overcome the compression in the end of the cylinder will always be greater than the pressure required to shift the valves. The shifting of the valve occurring before the piston has reached the end of its stroke, admission behind the piston is stopped before the end of the stroke is reached and so there is no danger of the piston striking the cylinder head through the actuating pressure, admitted through the admission ports, 13 and 14, exceeding the compression pressure.

This motor is relatively economical in its use of air or steam, since the valve is shifted, not by the use of live air taken direct from the valve chest and by opening leakage ports, as has been the case in certain former pneumatic tools, but to the contrary the valve is shifted by air or steam taken from the cylinder 1; which air or steam has already actuated the main piston. The inertia of the reciprocating parts, and the clearance volumes at the ends of the cylinders, are so adjusted relatively that the compression pressure, at the end of the stroke of the piston, nearly equals the normal working pressure under which steam or air is supplied to the motor. To prevent excessive speed when the motor is working light, the area of the admission ports is such that when the piston moves at a speed greater than the desired maximum speed, the port area is inadequate to maintain full working pressure behind the piston, in which case the compression effected in the opposite end of the cylinder after closure of the exhaust port by the piston, is due largely to the inertia of the reciprocating parts of the motor, and of the riddling machine to which it is attached, thereby requiring less admission of live air at full working pressure, resulting in greater economy in air consumption. Since the exhaust ports 15 and 16 communicate with portions of the valve chest intermediate valve pistons 8 and 9, and 10 and 11, operation of the motor cannot be interfered with by leakage either from the central portion of the valve chest, with which admission port 23 connects, or by leakage from the end portions of the valve chest, in which cushioning compression takes place; for any air or steam leaking from the central portion of the valve chest past valve pistons 9 and 10, merely leaks into the exhaust spaces of the valve chest; and similarly, any air or steam leaking from the end portions of the valve chest past valve pistons 8 and 11, merely leaks into the exhaust spaces of the valve chest.

What I claim is:—

1. A reciprocating motor comprising in combination a cylinder, a valve chest, a main piston in said cylinder and a valve in said valve chest, said valve having piston-heads for the shifting of the valve by fluid under pressure, separate admission and exhaust ports for each end of the cylinder, extending from said cylinder to said valve chest, and arranged to be covered and uncovered, in said valve chest, by the valve, the said exhaust ports arranged to be covered, by the piston, at an intermediate point in the stroke of said piston and well after the return stroke of the piston has begun, and valve-shifting ports extending from said cylinder to said valve chest and terminating in the valve chest on opposite sides of their respective valve-piston-heads, said valve shifting ports arranged to be uncovered, alternately, by the main piston during reciprocation thereof, and when so uncovered, to communicate fluid under pressure from the cylinder to the valve chest, for the shifting of the valve; said valve chest having spaces each located at a point intermediate the points of termination of an admission port and its corresponding valve shifting port, which spaces are connected to exhaust.

2. A reciprocating motor comprising in combination a cylinder, a valve chest, a main piston in said cylinder and a valve in said valve chest, said valve having piston-heads for the shifting of the valve by fluid under pressure, separate admission and exhaust ports for each end of the cylinder, extending from said cylinder to said valve chest and arranged to be covered and uncovered, in said valve chest, by the valve, the said exhaust ports arranged to be covered, by the piston, at an intermediate point in the stroke of said piston, at an intermediate point in the stroke of said piston and well after the return stroke of the piston has begun, and valve-shifting ports extending from said cylinder to said valve chest and terminating in the valve chest on opposite sides of their respective valve-piston-heads, said valve shifting ports arranged to be uncovered, alternately, by the main piston during reciprocation thereof, and when so uncovered, to communicate fluid under pressure from the cylinder to the valve chest, for the shifting of the valve, said valve chest having spaces, each located at a point intermediate the points of termination of an admission port and the corresponding end of said valve chest, which spaces are connected to exhaust, and relief ports adapted to connect the end portions of said valve chest to such exhaust spaces, such relief ports arranged to be over-ridden and closed by the valve, alternately, during reciprocation of the latter, and before the end of the stroke of the valve is reached, whereby the valve is cushioned by fluid imprisoned in the end portion of the valve chest.

3. A reciprocating motor comprising in combination a cylinder, a valve chest, a main piston in said cylinder and a valve in said valve chest, admission and exhaust ports controlled by said valve, and valve shifting ports extending from said cylinder to said valve chest and arranged to be uncovered, alternately, by the main piston during reciprocation thereof, and when so uncovered, to communicate fluid under pressure from the cylinder to the valve chest, for the shifting of the valve, said valve chest having spaces, each located intermediate the point of termination of an admission port in said chest, and the corresponding end of said valve chest, which spaces are connected to exhaust, and relief ports adapted to connect the end portions of said valve chest to such exhaust spaces, such relief ports arranged to be over-ridden and closed by the valve, alternately, during reciprocation of the latter, and before the end of the stroke of the valve is reached, whereby the valve is cushioned by fluid imprisoned in the end portion of the valve chest.

4. A reciprocating motor comprising in combination a cylinder, a main piston therein, a valve chest, separate admission and exhaust ports for each end of the cylinder, valve chest relief ports, and valve-shifting ports extending from said cylinder to said valve chest, said exhaust ports terminating in said valve chest between the points of termination in said chest of the admission ports and said relief ports, said relief ports connecting the ends of the valve chest with the spaces in said valve chest with which said exhaust ports communicate, and a piston valve in said valve chest having valve pistons for the control of said admission and exhaust ports, and having also pistons for the shifting of the valves by fluid pressure and for the control of said valve-chest relief ports, said valve shifting ports terminating in the valve chest on opposite sides of their respective valve-piston heads, and arranged to be uncovered, alternately, by the main piston during reciprocation thereof, and when so uncovered to communicate fluid under pressure from the cylinder to the valve chest, for the shifting of the valve.

5. A reciprocating motor comprising in combination a cylinder, a main piston therein, a valve chest, admission and exhaust ports connecting said cylinder and valve chest, the exhaust ports arranged to be overridden and closed by said main piston, alternately, before the end of the stroke of the piston is reached, a valve in said valve chest controlling admission and exhaust, and means for shifting the valve automatically said valve chest having spaces at points intermediate the points of termination of the admission ports in said valve chest and the ends of said valve chest, which spaces are connected to exhaust, and relief ports controlled by said valve and adapted to connect the end portions of said valve chest to said exhaust spaces.

6. A reciprocating motor comprising in combination a cylinder, a main piston therein, a valve chest, admission and exhaust ports connecting said cylinder and valve chest, the exhaust ports being symmetrically arranged with respect to the cylinder and arranged to be over-ridden and closed by said main piston, alternately, before the end of the stroke of the piston is reached, a supplemental exhaust port for one end of said cylinder communicating with the cylinder at a point nearer the end of the cylinder than the main exhaust port for that end of the cylinder, but likewise arranged to be over-ridden and closed by the piston, a valve in said valve chest controlling admission and exhaust, and means for shifting the valve automatically.

7. A reciprocating motor comprising in combination a cylinder, a main piston therein, a structurally separate valve chest, and a valve in said valve chest, said cylinder and valve chest having closely fitting abutting surfaces and having admission, exhaust and valve shifting ports connecting said cylinder and valve chest and having also relief ports connecting the ends of said valve chest to exhaust, said relief ports comprising recesses formed in that surface of the valve chest which abuts against a surface of the cylinder, such recesses communicating with the end portions of the valve chest and with the exhaust port.

8. A reciprocating motor comprising in combination a cylinder, a main piston therein, a valve chest, and a valve in said valve chest, and admission, exhaust and valve shifting ports connecting said cylinder and valve chest, said cylinder and valve chest having closely fitting abutting surfaces, the valve shifting ports comprising recesses formed in that surface of the cylinder with which a corresponding surface of the valve chest abuts, the admission ports comprising cored passages in the cylinder located alongside of said valve shifting ports but at a lower level, said admission ports located on one side of the longitudinal center of the structure and the exhaust ports located on the other side of such longitudinal center.

9. A reciprocating motor comprising in combination a cylinder, a main piston therein, a valve chest, and a valve in said valve chest and separate admission, exhaust and valve shifting ports for each end of the cylinder connecting said cylinder and valve chest, the admission ports terminating in said valve chest between the points of termination of the said exhaust ports in said valve chest, said valve comprising four valve-pistons, the two intermediate pistons controlling the admission and exhaust ports of the valve chest, the two end pistons serving for the shifting of the valve by fluid pressure, the valve chest having an admission connection between the two intermediate valve pistons, and having exhaust connections between said intermediate valve pistons and end valve pistons, the valve shifting ports connecting with the end portions of the valve chest; whereby fluid leaking either from the end portions of the valve chest or from the admission portion of the valve chest, past the valve pistons, is received by the exhaust portions of the valve chest.

10. A reciprocating motor comprising in combination a cylinder, a main piston therein, a valve chest, and a valve in said valve chest, and separate admission and exhaust ports for each end of the cylinder connecting said cylinder and valve chest, the admission port and the exhaust port for each end of the cylinder located on opposite side of the longitudinal center line; and means for operating said valve.

In testimony whereof I have signed this specification in the presence of two subscribing witnesses.

CLARENCE A. DAWLEY.

Witnesses:
H. M. MARBLE,
D. A. DAVIES.

---

Copies of this patent may be obtained for five cents each, by addressing the "Commissioner of Patents, Washington, D. C."